March 26, 1935.   R. R. SHAFTER ET AL   1,995,948
CALCINER
Filed Nov. 28, 1933   2 Sheets-Sheet 1

Inventors
Ruland R. Shafter
Richard Bernhard
by
Eugene H. Purdy
Attorney

March 26, 1935.  R. R. SHAFTER ET AL  1,995,948
CALCINER
Filed Nov. 28, 1933   2 Sheets-Sheet 2
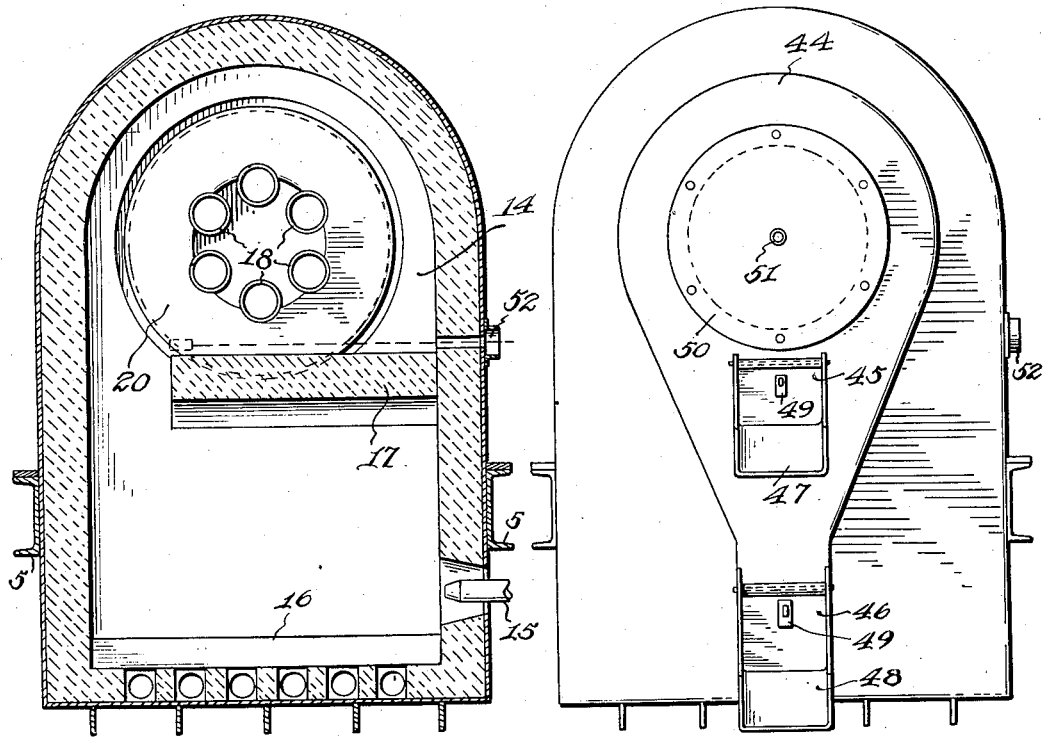
*Fig. 2.*   *Fig. 3.*
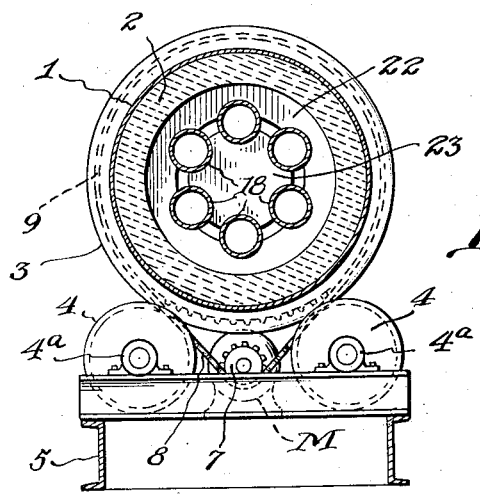
*Fig. 4.*
Inventors
Ruland R. Shafter
Richard Bernhard
By
Eugene K. Purdy
Attorney Patented Mar. 26, 1935

1,995,948

UNITED STATES PATENT OFFICE 1,995,948

CALCINER

Ruland R. Shafter, Freeport, N. Y., and Richard Bernhard, Allentown, Pa., assignors to Traylor Engineering & Manufacturing Company, a corporation of Delaware Application November 28, 1933, Serial No. 700,155

6 Claims. (Cl. 222—7)

This invention relates to calcining and more especially to the calcining of earthy minerals, such as the carbonates of calcium and magnesium, which when heated liberate a gas.

Lime, according to present practice, is usually prepared by burning limestone in a kiln—either of the vertical tower type or of the horizontal rotary type—in direct contact with a flame so that the carbon dioxide gas that is driven off from the limestone is, as a result, diluted with a large volume of the fuel gases as well as with a large amount of unconsumed gases accompanying the air which is taken into the kiln to support combustion. The lime made in this way is likewise contaminated by the fuel gases unless expensive carefully selected fuels are used to fire the kiln. As a result, the quality of the carbon dioxide so produced does not justify its recovery and it is therefore permitted to escape to the atmosphere, while the lime so formed is not fit for use for many industrial purposes without further purification and conditioning which lengthens the time and increases the cost of its manufacture.

Another objection to this mode of lime burning resides in its thermal inefficiency occasioned by the absorption of heat by the large volume of incombustible, and hence redundant, gases of the air supplied to the kiln to support combustion, which gases are objectionable for the further reason that they operate to increase the pressure within the kiln and thus retard the evolution of carbon dioxide by the limestone.

While an attempt has been made to overcome the above objections by burning limestone in closed retorts and withdrawing the carbon dioxide as it is generated, this has not proved altogether successful for the reason that the operation is slow and wasteful in heat consumption, requiring as it does periodic interruptions to discharge and recharge the retorts.

An important aim of our invention is to provide a continuous process of calcining whereby the limestone is occluded from the atmosphere and from the fuel gases during burning thus preserving the carbon dioxide gas against dilution and the lime against contamination and allowing the recovery of these products in a pure state.

Another aim of the invention is to provide a calciner of the muffle type particularly designed for carrying out the above process in an efficient manner, this apparatus defining a gas-tight system through which the material being treated is continuously passed and incorporating means for withdrawing the liberated carbon dioxide gas as rapidly as it is formed.

Still another object of the invention is to provide a horizontal rotary kiln having one end extending into and in communication with the combustion chamber of a furnace and having an exhaust fan for withdrawing fuel gases from the opposite end of the kiln in a manner such that the fuel gases flowing through the kiln impart heat to a series of open-ended muffle tubes disposed lengthwise within the kiln and containing the crushed limestone. The muffle tubes, which desirably will be made of some heat resisting steel, project beyond the rear end of the kiln and intersect the combustion chamber in which they are exposed to the intense heat of the burner located therein. According to the preferred form of the invention the calciner is disposed at an inclination so that the limestone will pass through the tubes by gravity.

An important feature of the invention is the provision of means for feeding limestone into the muffle tubes and for withdrawing the fuel gases from an end of the kiln while protecting the lime and evolved carbon dioxide gas from contact with these fuel gases. The muffle tubes project beyond opposite ends of the kiln and open at its forward end into a chamber which provides a space for the reception of incoming material and for the collection of carbon dioxide gas generated within the muffle tubes while maintaining this gas segregated from the fuel gases which pass out at the same end of the kiln. At the rear end of the kiln the muffle tubes open into a casing sealed to the atmosphere and to the fuel gases flowing through the kiln. The calcined material discharged from the tubes falls upon an annular drum secured to the muffle tubes so as to rotate with the kiln. The wall of this drum is formed of a screen over which the lime must pass before issuing from the open end of the drum, thus effecting a separation of the dust from the calcines.

Preferably a series of baffles are disposed within the kiln in such manner as to create a sweep of the fuel gases across the muffle tubes, as distinguished from a flow along or parallel to the tubes, thus causing the gases to give up a maximum amount of heat to the tubes in their movement through the kiln.

With these and other objects in view the invention consists in an improved process and apparatus for calcining as hereinafter described and claimed.

A clearer understanding of the invention will be had from the following detailed description of one preferred embodiment thereof considered in the light of the annexed drawings in which:

Figure 2 is a transverse cross-section of the calciner taken on the line 2—2 of Fig. 1 passing vertically through the kiln and furnace structure;

Figure 3 illustrates the calciner viewed from its rear or discharge end; and

Figure 4 is a transverse cross-section through the calciner taken on the line 4—4 of Fig. 1.

Figure 1:
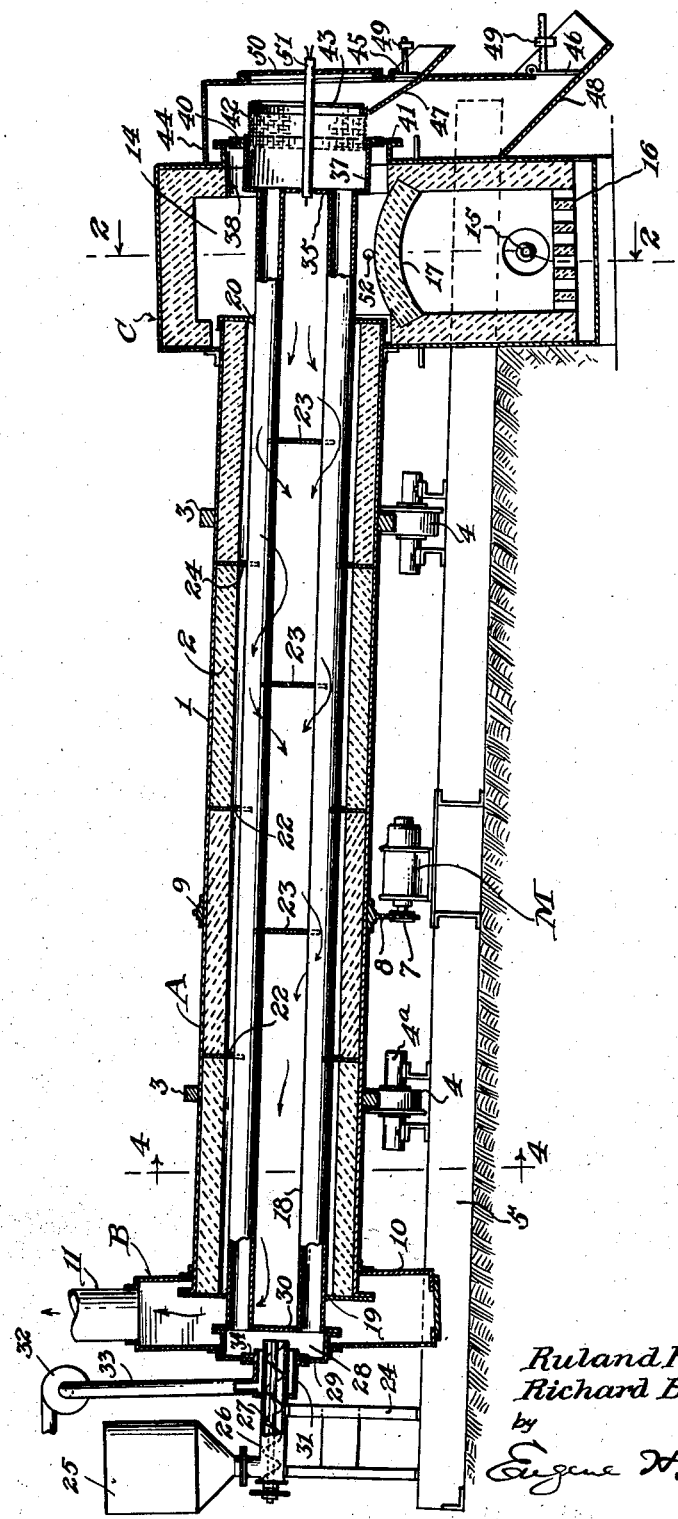
Figure 1 is a side view of a rotary calciner in longitudinal cross-section.

The muffle-type calciner shown in the drawings is composed of three principal parts, a rotary kiln A, a stationary stack B at the forward end of the kiln, and a furnace C at the rear end of the kiln. The kiln A comprises a cylindrical shell 1 disposed at a slight inclination to the horizontal and lined with some refractory material 2 such as fireclay. Girdling the kiln and located at spaced distances from its opposite ends is a pair of tires 3 engaging rollers 4, which latter are in turn journaled in bearings 4a fastened to structural members defining a bed 5 located below and extending lengthwise of the kiln. The rollers 4 are flanged to prevent endwise displacement of the kiln. The kiln is rotated upon the rollers by means for an electric motor M which through suitable speed reduction mechanism drives a sprocket 7. The sprocket transmits motion to the kiln through a chain 8 winding between the sprocket 7 and a ring gear 9 rigidly connected to the circumference of the kiln.

The forward end of the kiln projects through a wall of a stationary housing 10 defining the lower box-shaped end of the vertical stack B, and this housing is connected to atmosphere through a vertical flue 11.

The rear end of the kiln opens through a wall of the furnace C into a combustion chamber 14 having a relatively thick lining of refractory material such as fireclay. This furnace which is relatively narrow in proportion to its height is fired by a gas or oil burner 15, air being taken into the furnace through a grid-like hearth 16. An arched baffle 17 extending between the side walls of the combustion chamber at an elevation above the burner but terminating short of the end wall of the chamber causes a circulation of hot fuel gases from the burner in the bottom of the chamber around the end of the baffle 17 into the upper portion of the chamber, and thence into the open end of the kiln.

Extending lengthwise through the kiln are a series of muffle tubes 18 arranged in spaced apart circular formation and made of a good quality of heat resisting steel capable of successfully withstanding temperatures up to 2100 degrees F. These muffle tubes extend beyond opposite ends of the kiln and are slidable in a front end plate 19 and welded within a rear end plate 20 which plates in turn are welded or otherwise rigidly fastened to the shell 1 of the kiln. These end plates are of annular shape and afford a free passage for gases. At spaced intervals throughout the length of the kiln upon its interior is a series of baffle rings 22 which support the muffle tubes and prevent their buckling or sagging, although this sagging tendency is overcome to some extent by the rotary motion of the kiln. Intermediate the baffle rings 22 is a series of baffle disks 23 supported upon the tubes and of an appreciably less diameter than the inside of the kiln. By this arrangement the fuel gases flowing through the kiln from the combustion chamber to the stack are caused to take a tortuous path and move back and forth across the tubes, as indicated by the arrows in Fig. 1, thus insuring the giving up of a maximum amount of their heat to the tubes.

The means by which material to be treated is introduced into the calciner will now be described. At the forward end of the apparatus supported upon a steel frame 24 is a hopper 25 adapted to contain a supply of crushed limestone. The bottom of the hopper is in communication with one end of a horizontally-disposed conveyor pipe 26 within which operates a screw conveyor 27, driven from any suitable source of power. The end of the conveyor pipe projects into a chamber 28 located at the forward end of the apparatus and defined by a cup-shaped cap 29 welded or otherwise sealed to a header 30 supported upon the ends of the muffle tubes a spaced distance from the forward end of the shell 1. The ends of the muffle tubes pass through and are fastened to the header 30 so as to extend into communication with the chamber. The cap 29 protrudes through the front wall of the housing 10 and is provided with a central circular opening coinciding with the axis of rotation of the kiln through which the conveyor pipe 25 projects into the chamber. Surrounding the conveyor pipe and concentric therewith is a thimble 31 fixedly mounted and sufficiently oversize to provide a withdrawal passage for carbon dioxide gas generated in the muffle tubes. A circular flange 34 loosely mounted upon the exterior of the stationary thimble 31 makes a tongue-and-groove slip connection with the edges of the opening in the rotary cap 29 closing the clearance space around the thimble. A suction fan 32, indicated conventionally in Fig. 1, is connected to the thimble 31 through an off take conduit 33 for withdrawing the evolved carbon dioxide gas and delivering it to a storage bell, not shown. Preferably this fan is operated at a speed such as to create a sub-atmospheric pressure within the muffle tubes.

The calcined lime is delivered from the rear end of the kiln in the following manner: The end of the muffle tubes project from the open end of the kiln and extend across the upper half of the combustion chamber above the burner. These tubes open through and are connected to a header 35 forming the end wall of an open-ended cylindrical drum 37. This rotating drum projects outwardly of the furnace through an opening 38 in the furnace wall, the clearance surrounding the drum being closed against the escape of fuel gases through the medium of a seal comprising a circular flange 40 loosely mounted upon the circumference of the drum and having an interfitting tongue-and-groove slip connection with a stationary closure plate 41 fastened to the wall of the furnace.

Forming a prolongation of the drum 37 is a cylindrical screen section 42, provided with a terminal ring 43, over which the lime passes in moving to discharge. In this way, the dust accompanying the burned lime passes through the screen and the lumps of lime are delivered off its end free from dirt. The drum 37 located exteriorly of the furnace is enclosed within a casing 44 sealed against the atmosphere except for two discharge ports, normally closed by doors 45 and 46, through which ports the calcines and dust are delivered by chutes 47 and 48 respectively. The doors are hinged and provided with weighted levers 49 by which they are always urged toward closed position, which causes their lower ends to embed in the material passing down the chutes so as to prevent the infiltration into the system of any appreciable amount of air. A cleanout door 50 is provided for affording access to the interior of the drum and muffle tubes. A sleeve 51 is desirably extended along the axis of rotation of the kiln through the door 50 into the combustion chamber for the insertion of a pyrometer into a central position with respect to the ring of tubes. Similarly an opening 52 is provided at one end of the kiln for the insertion of a pyrometer below the muffle tubes and just above and adjacent the end of the baffle 17. This permits an accurate check to be kept upon the temperature within the combustion chamber.

The operation of the apparatus is as follows: The kiln is set in motion by starting the motor M. Crushed limestone contained in the hopper 25 is fed into the rotating chamber 28 at the forward end of the kiln by the screw conveyor 27 operating in the conveyor pipe 26. Of course, instead of a screw conveyor any other means for supplying limestone to the chamber 28, such as an inclined spout, may be employed. The entire apparatus is inclined at such an angle that the material, under the combined action of gravity and rotation, automatically feeds from the chamber 28 into and along the muffle tubes 18. As the limestone progresses toward the rear or lower end of the kiln, during which it is tumbled about within the tubes and equally brought into contact with the hot walls of the tubes, its temperature is gradually raised by the fuel gases flowing through the kiln and deflected across the tubes by the baffle rings and disks 22 and 23. Heating of the limestone is attended with an evolution of carbon dioxide gas and this gas, by the suction of the fan 32, is withdrawn from the tubes into the chamber 28 through the thimble 31 surrounding the conveyor pipe and thence out via the conduit 33 to storage. The fan 32, as has before been stated, will preferably be operated at a speed such that a partial vacuum is maintained within the tubes to accelerate the liberation of carbon dioxide from the limestone and consequently hastening the calcining operation. As the limestone traverses those sections of the muffle tubes disposed within the combustion chamber and exposed to the intense heat of the burner, the calcination will be completed and all the limestone converted into lime.

The lime passing out of the muffle tubes spills into the rotating drum 37 and in passing over the screen section 42 the lumps are freed from any accompanying dust.

The calcining operation is thus greatly expedited. By reason of the fact that the operation takes place in a gas-tight system, the resulting carbon dioxide is very pure and undiluted with extraneous gases and therefore particularly suited for use in the manufacture of such products as soda ash, alkali, and solid carbon dioxide. The lime likewise is untained by the fuel gases and therefore free from ash and from sulphur, phosphorus and other compounds contained in various fuels. These products as a consequence lend themselves particularly well for use in the industries without the necessity for further purification or conditioning.

It will be appreciated that all places at which stationary and rotating parts of the apparatus intersect will be suitably sealed against the escape of fuel gases, or against the infiltration of air into the tubes under conditions where a sub-atmospheric pressure is maintained in the system.

The calciner construction described above represents a preferred embodiment of our invention, but manifestly various changes in arrangement and design may be made therein without departing from the spirit of the invention.

We claim:

1. A muffle-type calciner comprising a combustion chamber, a horizontal open-ended rotary kiln having a portion adjacent its end located within and in communication with the combustion chamber, a plurality of muffle tubes passing longitudinally through the kiln for containing material to be calcined, said muffle tubes being supported by the kiln so as to rotate therewith, an outlet for the fuel gases adjacent one end of the kiln, an outlet for the gas evolved by the material within the tubes adjacent the same end of the kiln, an inlet for material to be calcined adjacent the gas-outlet end of the kiln, a discharge outlet for the calcined material adjacent the opposite end of the kiln, means for rotating the kiln, and independent means for carrying off the fuel gases and evolved gas while maintaining segregation thereof.

2. A muffle-type calciner comprising a horizontally disposed cylindrical kiln, a vertical stack located at the forward end of the kiln and a combustion chamber located at the rear end of the kiln, said kiln being open at both ends and forming a passageway for the flow of fuel gases from the combustion chamber to the stack, means for rotating the kiln, a series of material-carrying muffle tubes extending longitudinally through and beyond the forward end of the kiln, a plurality of baffle members arranged upon the interior of the kiln so as to deflect the fuel gases flowing in the kiln across the muffle tubes, a cap connected to and forming a closed chamber in communication with the forward ends of the tubes, a cylindrical inlet located centrally of the cap corresponding to the axis of rotation of the kiln, and a screw conveyor for discharging material to be calcined through said inlet into said chamber.

3. A muffle-type calciner comprising a horizontally-disposed cylindrical kiln, a vertical stack located at the forward end of the kiln, a combustion chamber located at the rear end of the kiln, said kiln being open at both ends and forming a passageway for the flow of fuel gases from the combustion chamber to the stack, means for rotating the kiln, a series of material-carrying muffle tubes extending longitudinally through and beyond the forward end of the kiln, a plurality of baffle rings rigidly connected to the interior of the kiln and supporting the tubes in spaced relation, a plurality of baffle disks of less diameter than the interior of the kiln located intermediate the baffle rings whereby the combustion gases flowing through the kiln are deflected across the muffle tubes, a cap connected to and forming a closed chamber in communication with the forward ends of the tubes, an inlet located centrally of the cap corresponding to the axis of rotation of the kiln, and a screw conveyor for discharging material to be calcined through this inlet into said chamber.

4. A muffle-type calciner comprising a horizontally-disposed cylindrical kiln, a vertical stack located at the forward end of the kiln and a combustion chamber located at the rear end of the kiln, said kiln being open at both ends and forming a passageway for the flow of fuel gases from the combustion chamber to the stack, means for rotating the kiln, a series of material-carrying muffle tubes extending longitudinally through and beyond the forward end of the kiln and supported within the kiln so as to rotate therewith, a cap connected to and forming a closed chamber in communication with the forward ends of the tubes, a pair of concentric conduits communicating with the chamber centrally of the cap corresponding to the axis of rotation of the kiln, a conveyor for discharging material to be calcined through one of the conduits into the chamber and an off take communicating with the other conduit for withdrawing gas from the chamber.

5. A muffle-type calciner comprising a horizontally-disposed cylindrical kiln, a vertical stack located at the forward end of the kiln and a combustion chamber located at the rear end of the kiln, said kiln being open at both ends and forming a passageway for the flow of fuel gases from the combustion chamber to the stack, means for rotating the kiln, a series of material-carrying tubes extending longitudinally through and beyond the forward end of the kiln, and supported within the kiln so as to rotate therewith, a cap connected to and forming a closed chamber in communication with the forward ends of the tubes, a pair of concentric conduits communicating with the chamber centrally of the cap corresponding to the axis of rotation of the kiln, a conveyor for discharging material to be calcined through the inner conduit into the chamber, and an exhaust fan connected to said outer conduit for withdrawing gas from the chamber.

6. A muffle-type calciner comprising a horizontally disposed cylindrical kiln, a stationary vertical stack located at the forward end of the kiln and a combustion chamber located at the rear end of the kiln, said kiln being open at both ends and forming a passageway for the flow of fuel gases from the combustion chamber to the stack, means for rotating the kiln, a series of material-carrying muffle tubes extending longitudinally through and beyond the ends of the kiln, closed chambers at opposite ends of the muffle tubes sealed to the atmosphere, and means for feeding material to said tubes comprising an inlet in the chamber at the forward end of the muffle tubes coinciding with the axis of rotation of the kiln a tubular conveyor pipe extending through said inlet and a screw conveyor operating within said conveyor pipe.

RULAND R. SHAFTER.
RICHARD BERNHARD.